(12) United States Patent
Elwell

(10) Patent No.: US 6,464,437 B1
(45) Date of Patent: Oct. 15, 2002

(54) PUSH-DOWN POP-UP TIE MECHANISM

(75) Inventor: James P. Elwell, Ankeny, IA (US)

(73) Assignee: Putco, Inc., Story City, IA (US)

( * ) Notice: Subject to any disclaimer, the term of this patent is extended or adjusted under 35 U.S.C. 154(b) by 0 days.

(21) Appl. No.: 09/697,517

(22) Filed: Oct. 26, 2000

(51) Int. Cl.$^7$ .................................................. B60P 7/08
(52) U.S. Cl. ........................ 410/107; 410/106; 410/110; 410/111
(58) Field of Search .................................. 410/101, 106, 410/107, 110, 111, 116; 24/265 CD, 115 K; 248/499; 296/43

(56) References Cited

U.S. PATENT DOCUMENTS

| | | | |
|---|---|---|---|
| 3,102,708 A | | 9/1963 | Crain .......................... 410/107 |
| 3,298,652 A | * | 1/1967 | Burdick ....................... 410/107 |
| 3,421,726 A | * | 1/1969 | Getter ......................... 410/110 |
| 3,595,125 A | * | 7/1971 | Jacobs ......................... 410/106 |
| 4,607,991 A | * | 8/1986 | Porter ......................... 410/110 |
| 4,890,566 A | * | 1/1990 | Morris ..................... 410/107 X |
| 5,106,248 A | * | 4/1992 | Harris ......................... 410/107 |
| 5,476,349 A | | 12/1995 | Okland ........................ 410/106 |
| 5,618,140 A | | 4/1997 | Okland ........................ 410/106 |
| 5,676,508 A | * | 10/1997 | Weicht .................... 410/106 X |
| 5,738,471 A | * | 4/1998 | Zenter et al. ................ 410/110 |
| 5,915,900 A | * | 6/1999 | Boltz .......................... 410/110 |
| 5,971,684 A | * | 10/1999 | Wang .......................... 410/107 |
| 6,231,285 B1 | * | 5/2001 | Elwell et al. ................ 410/107 |

* cited by examiner

*Primary Examiner*—Stephen T. Gordon
(74) *Attorney, Agent, or Firm*—McKee, Voorhees & Sease, P.L.C.

(57) ABSTRACT

A tie down mechanism includes an elongated tie down post and a hollow stake post having a hollow shaft adapted to fit in the stake pocket. The hollow shaft includes an aperture therein for slidably receiving the tie down post. Expander block assemblies secure a portion of the hollow shaft in the stake pocket. A spring is operably located between the stake post and the tie down post for yieldingly biasing the tie down post to extend relative to the stake post. The tie down mechanism further includes a cam groove and follower interconnecting the tie down post and the hollow shaft. The cam groove and follower allow the tie down post to be held in a retracted position or released into the extended position when needed without the use of exposed levers or hand tools.

19 Claims, 6 Drawing Sheets

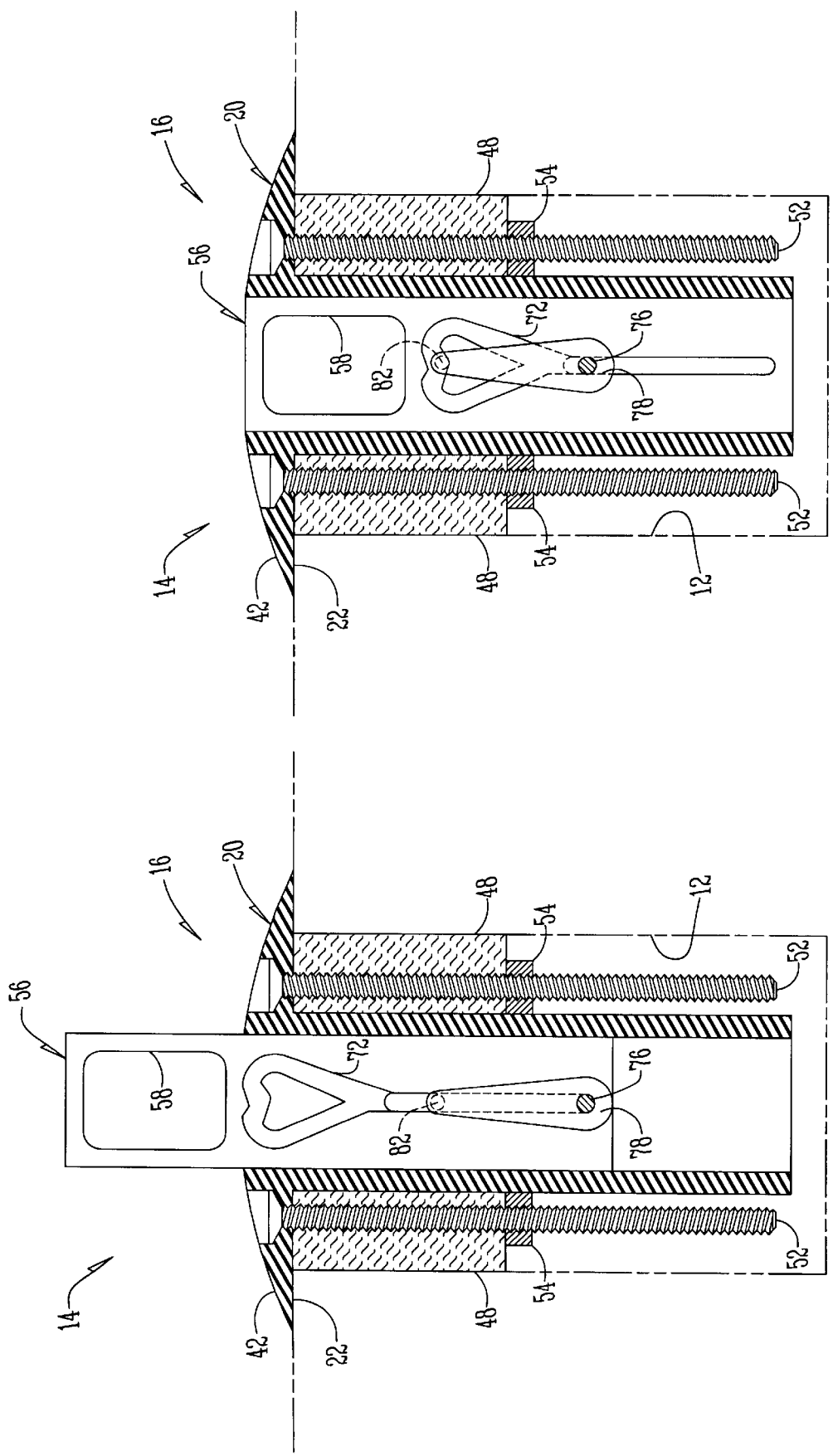

PUSH-DOWN POP-UP TIE MECHANISM

BACKGROUND OF THE INVENTION

The present invention relates to tie down mechanisms for use in the stake pockets of a vehicle such as a pickup truck.

Pickup trucks and the like are often used for hauling cargo. The driver of the truck must frequently tie down the cargo to anchoring means on the truck to prevent the cargo from shifting during travel. Tie downs are also used to cover the cargo with tarps to guard against inclement weather. Various conventional anchoring means have been developed and tried to accomplish the cargo or tarp tie down function. Most pickup trucks come from the factory equipped with a plurality of stake pockets spaced around the top of the bed wall. Mounting hooks can be mounted in the stake pockets so that they protrude upwardly therefrom. Many of the conventional designs involve more or less permanently mounting the hook in the stake pocket. This detracts from the aesthetic appearance of the vehicle. The hook can also interfere with loading of cargo or mounting of other accessories such as toppers, covers, and the like.

L. J. Crain discloses a retractable rope hook in U.S. Pat. No. 3,102,708. The hook is biased or "popped up" into an exposed operable position by a spring disposed below it in the stake pocket. A pivotal latch mechanism has a sweep arm that swing into engagement with a transverse groove in the side of the hook body to hold the hook in the exposed operable position. The sweep arm of the latch mechanism engages the bottom surface of the hook notch itself to hold the hook in a retracted position flush with the top of the stake pocket. While the latch mechanism is not extremely complex, it adds to the overall cost of the tie down device. Furthermore, the latch can get contaminated with rust or dirt since part of it is exposed to the elements. Thus, the latch can jam easily and a screwdriver may be required to rotate the latch, disengage the groove, and permit the hook to be pushed down. Finally, this retractable rope hook works only on a hook-style tie down because the rope-receiving notch is relied upon to latch the mechanism in the retracted position. The retractable rope hook fails to provide a fully enclosed eye for optimal flexibility and tie down security. Therefore, there is a need for an improved pop-up tie down mechanism.

A primary objective of the present invention is the provision of an improved pop-up tie down mechanism for use in the stake pocket of a cargo-hauling vehicle.

Another objective of this invention is the provision of a push-down pop-up tie down mechanism.

Another objective of this invention is the provision of a push-down pop-up tie down mechanism wherein the latching elements are concealed and protected from moisture and contamination.

Another objective of this invention is the provision of a push-down pop-up tie down mechanism that has a fully enclosed eye.

Another objective of this invention is the provision of a push-down pop-up tie down mechanism that is inexpensive to manufacture, reliable, versatile, and durable in use.

These and other objectives will be apparent from the drawings, as well as from the description and claims that follow.

SUMMARY OF THE INVENTION

The present invention relates to a push-down pop-up tie down mechanisms for use in the stake pockets of a vehicle such as a pickup truck. The tie down mechanism includes an elongated tie down post and a hollow stake post having a hollow shaft adapted to fit in the stake pocket. The hollow shaft includes an aperture therein for slidably receiving the tie down post. Means for securing a portion of the hollow shaft in the stake pocket are provided and a spring is operably located between the stake post and the tie down post for yieldingly biasing the tie down post to extend relative to the stake post. The tie down mechanism further includes a cam groove and follower means interconnecting the tie down post and the hollow shaft. The cam groove and follower allow the tie down post to be held in a retracted position or released into the extended position when needed without the use of exposed levers or hand tools.

BRIEF DESCRIPTION OF THE DRAWINGS

FIG. 3 is a sectional view taken along line 3—3 in FIG. 2 and shows the cam groove and the follower position when the tie down post is in the extended or "up" position. This figure also illustrates the frictional means for retaining the mechanism in the stake pocket.

FIG. 4 is a sectional view similar to FIG. 3, but shows the follower position when the tie down post is in the retracted or "down" position.

DETAILED DESCRIPTION OF THE PREFERRED EMBODIMENT(S)

Figure 1:
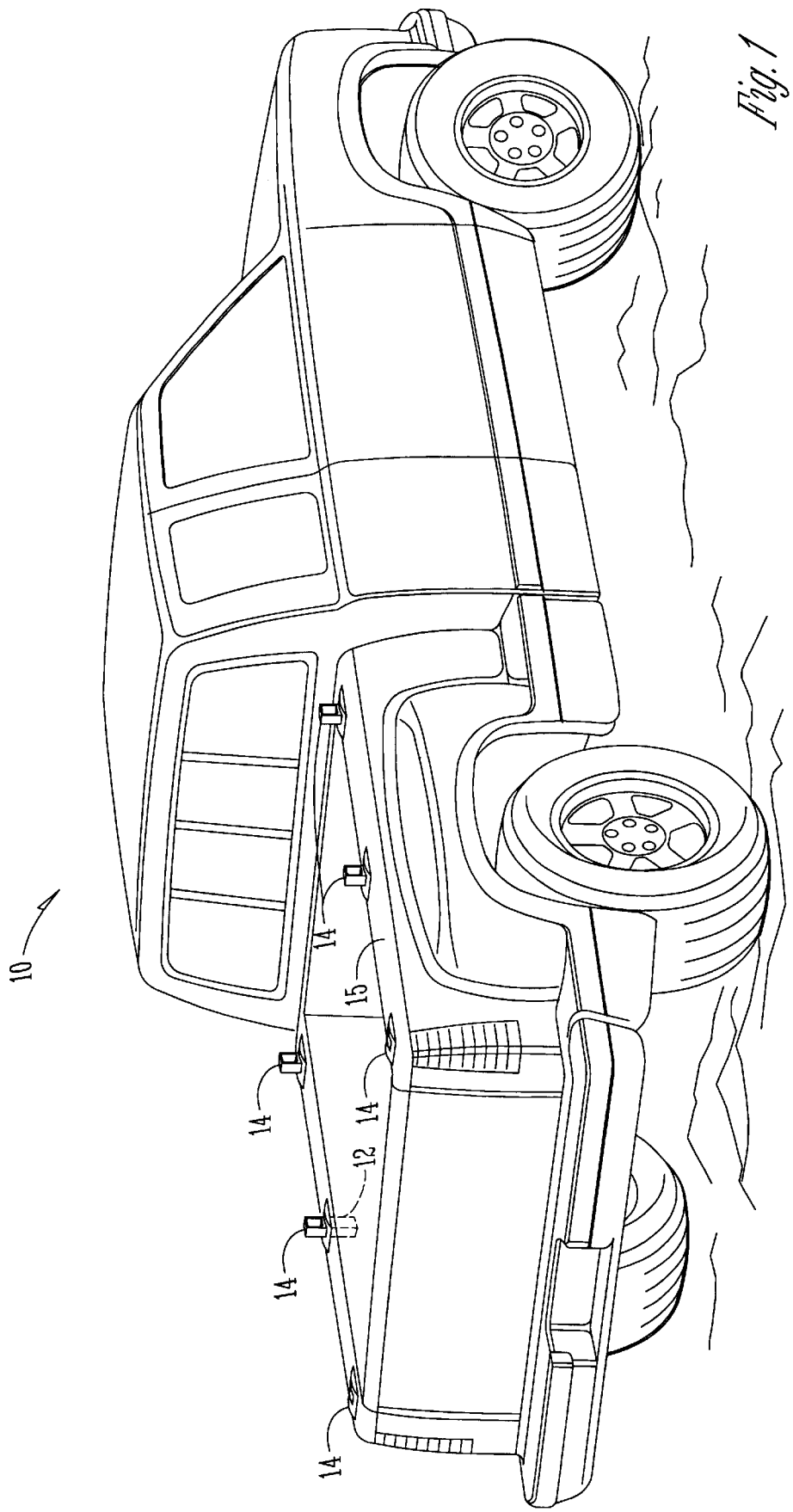
FIG. 1 is a perspective view of a pickup truck utilizing the tie down mechanism of the present invention.
Figure 2:
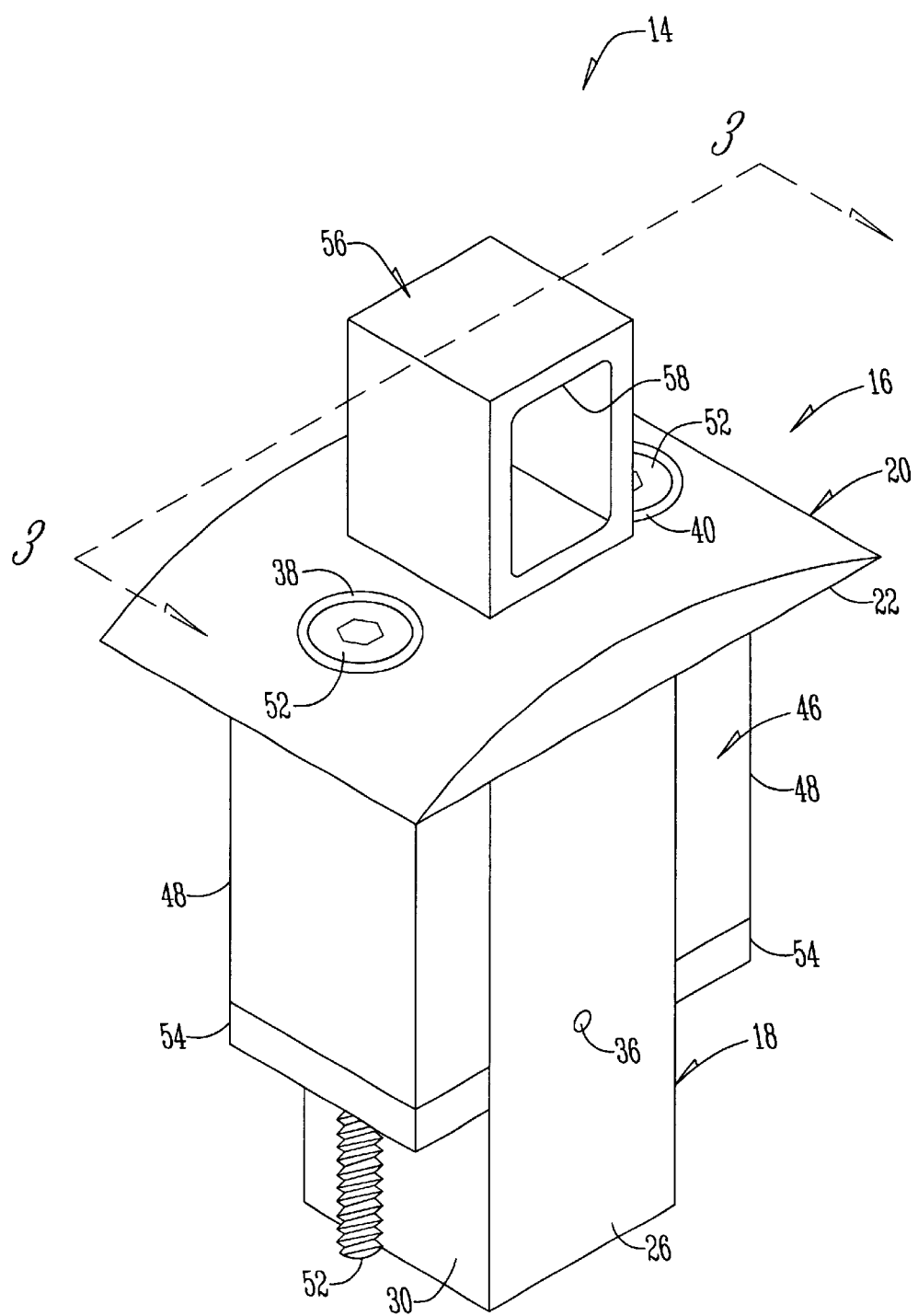
FIG. 2 is a perspective view that shows the tie down mechanism of this invention.
Figure 5:
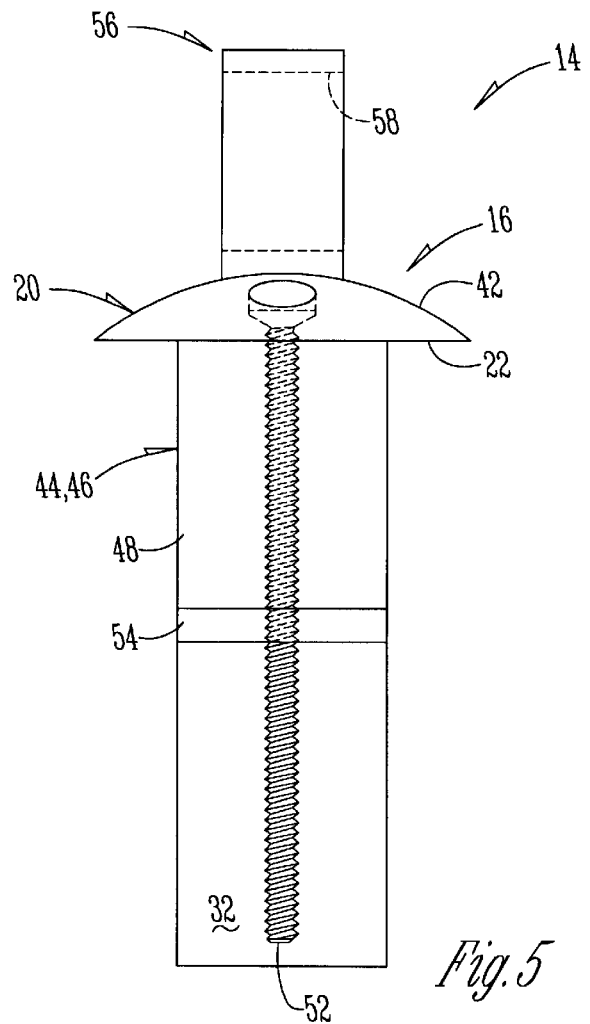
FIG. 5 is a side elevation view of the tie down mechanism.
Figure 6:
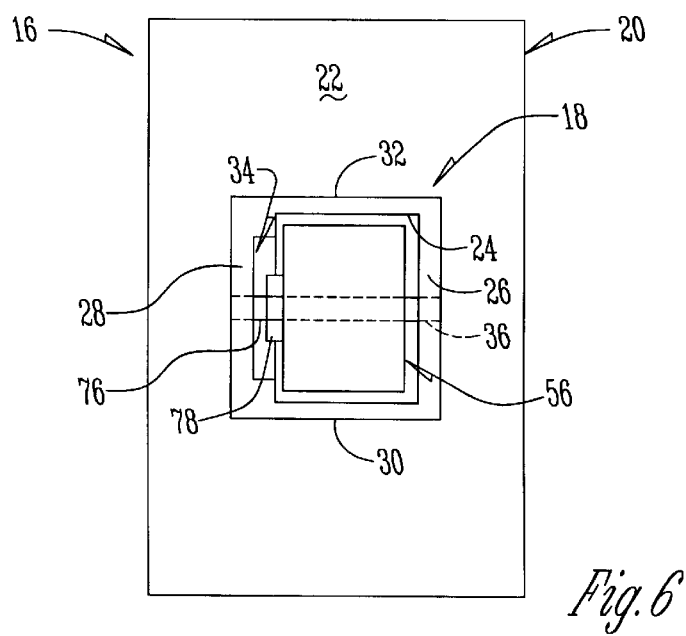
FIG. 6 is bottom view of the tie down mechanism and shows the pin hole and the cam follower cavity in the stake post. The expander block assemblies have been omitted for the sake of simplicity.
Figure 7:
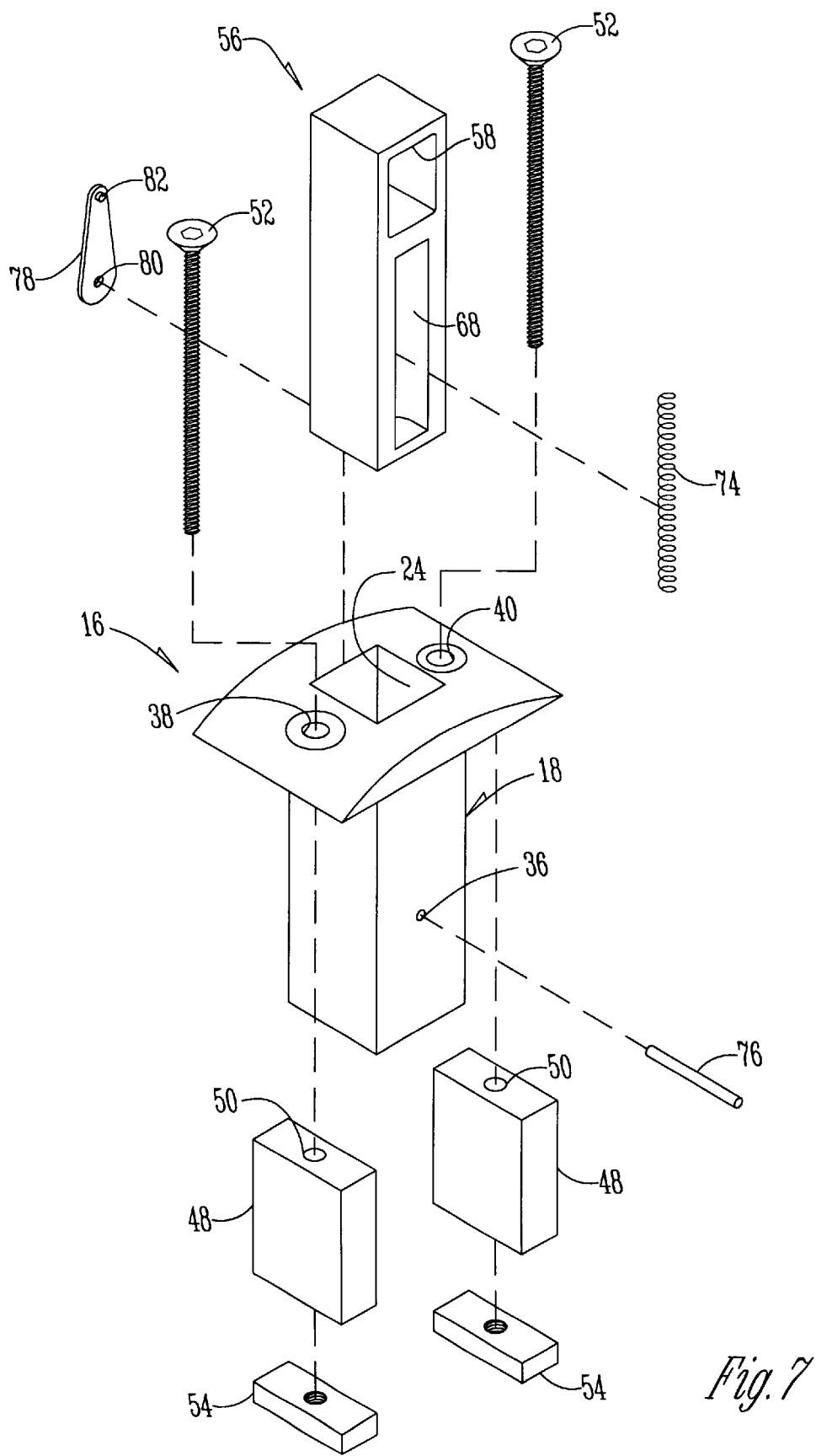
FIG. 7 is an exploded assembly view of the tie down mechanism of FIG. 2.

In FIG. 1, a vehicle 10, such as a pickup truck or the like, has a plurality of stake pockets 12 formed in the top of the bed wall 15. As best seen in FIGS. 2 and 7, the tie down mechanism 14 includes a stake post 16 that has a shaft 18 and a head 20 protruding laterally therefrom. The lower surface 22 of the head 20 is adapted to abut the top of the bed wall 15 and prevent the stake post 16 from completely falling into the stake pocket 12. An aperture 24 extends longitudinally through the shaft 18 and the head 20. Thus, the shaft 18 is hollow and preferably has a rectangular, more preferably a square, cross-section. The shaft 18 has opposing front and rear walls 26, 28 and opposing side walls 30, 32. See FIG. 6. The lower portion of the rear wall 28 has a clearance groove or slot 34 formed therein for reasons that will become apparent later. A small round hole 36 extends through the front and rear walls 26, 28. A pair of countersunk bolt holes 38, 40 are provided through the head 20, preferably one on each side of the aperture 24 and the shaft 18, as shown in FIGS. 2 and 7. The upper surface 42 of the head 20 can be substantially flat or can be slightly convex as shown.

A pair of resilient rubber expander block assemblies 44, 46 are positioned adjacent the side walls 30, 32 of the stake post 16. Each expander block assembly 44, 46 includes a substantially rectangular block of rubber 48 with a clearance hole 50 extending therethrough. A threaded bolt 52 installs through the hole 38 or 40 and the head 20 and extends through the hole 50 and the rubber block 48 to engage a rectangular nut 54 located at the bottom of the block 48. In the relaxed state shown in FIG. 2, the thickness of the expander block assemblies 44, 46 (in a vertical plane extending through both the assemblies 44, 46 and the center of the shaft 18) is sufficiently small so as to permit the insertion of the tie down mechanism 14 into the stake pocket 12. Thereafter, when the bolts 52 are turned so as to draw the nuts 54 closer to the head 20, the rubber blocks 48 eventually contact the lower surface 22 of the head 20. Then, further tightening of the bolt 52 into the nut 54 tends to cause the rubber block 48 to expand outwardly so as to create frictional engagement between the adjacent inner wall of the stake pocket 12 and the respective side walls 30, 32 of the stake post 16. Thus, the resilient expander block assemblies 44, 46 frictionally secure the stake post 16 and the stake pocket 12.

Figure 9:
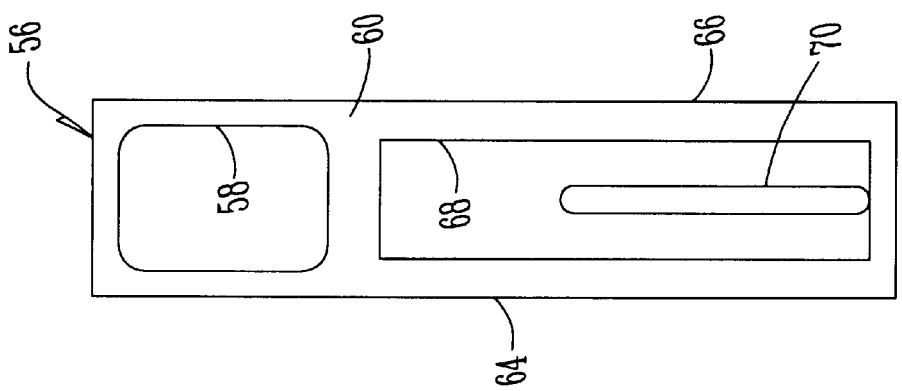
FIG. 9 is a front elevational view of the stake post as viewed from the right of FIG. 7.

The tie down mechanism 14 also includes a tie down post 56. A fully enclosed aperture or eye loop 58 extends through the upper portion of the tie down post 56. The eye loop 58 is exposed when the tie down post 56 is in its extended or "up" position. The tie down post 56 has a front wall 60, a rear wall 62 and opposite side walls 64, 66. A cavity 68 is formed in the front wall 60 of the tie down post 56 as best seen in FIGS. 7 and 9. A vertically elongated slot 70 extends through the tie down post 56 at the lower portion of the cavity 68.

Figure 8:
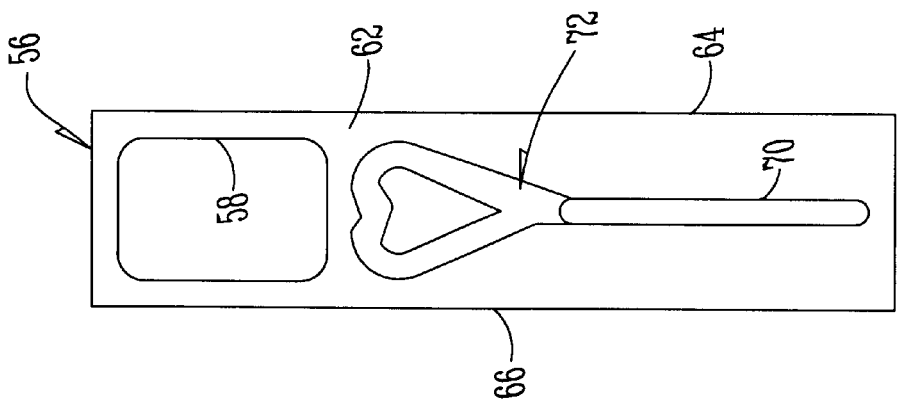
FIG. 8 is a rear elevational view of the tie-down stake post as viewed from the left of FIG. 7.

A substantially heart-shaped cam groove 72 is formed in the rear wall 62 of the tie down post 56, as shown in FIGS. 3, 4 and 8. The cam groove 72 is in communication with the upper end of the slot 70. Referring to FIG. 7, a coiled compression spring 74 is disposed in the cavity 68. A pin 76 extends through the hole 36 and through the slot 70 and the spring 74 once the tie down post 56 is installed in the aperture 24. A cam follower 78 has a hole 80 for receiving the pin 76 and is typically mounted thereto and disposed in the clearance groove or slot 34. The cam follower 78 is a thin, rigid strip that narrows in width when moving from its lower portion that has the hole 80 therein to its upper portion. The upper portion of the cam follower 78 has a truncated pin 82 cantilevered thereto which protrudes into the cam groove 72.

In operation, the lower portion of the spring 74 engages the pin 76. Thus, the spring 74 exerts an upwardly biasing force on the tie down post 56. When the tie down post 56 is in the extended or up position as shown in FIG. 3, the truncated follower pin 82 is located in the slot 70. The tie down post 56 is slidably disposed in the aperture 24 of the stake post 16. As the user pushes down on the tie down post 56, the follower pin 82 moves upwardly in the slot 70 and into the lower portion of the cam groove 72. The right hand side of the cam groove 72 extends lower than the left hand side of the groove 72. Therefore, the follower pin 82 tends to slide to the right and move up the right hand side of the cam groove 72, as shown in FIG. 4. Eventually, the follower pin 82 reaches the top of the right hand side of the groove 72 and the user ceases to apply a downward force on the tie down post 56. When this occurs, the follower pin 82 is automatically guided to the central portion of the heart-shaped cam groove 72, due to the profile of the groove 72 itself. In this retracted position, the tie down post 56 is preferably flush with the upper surface 42 of the head 20 and the eye loop 58 is thus concealed when not required for use. When the user later applies a second downward force on the tie down post 56, the follower pin 82 is automatically guided into the left hand side of the groove 72 and the tie down post 56 is automatically and yieldingly biased into an extended position once again by the spring 74. The cam follower 78 and follower pin 82 return to their original positions.

This invention provides a tie down mechanism 14 with a tie down post 56 that can be moved easily without the use of exposed levers and/or tools between an extended position (exposing the eye 58) and a retracted position (concealing the eye 58). The tie down mechanism 14 is yieldingly biased into the extended position, but can quickly and easily be lowered and locked into a retracted position when the tie down function is not required. To remove the mechanism 14 from the stake pocket 12, the user merely loosens the screws or bolts 52 until the expander blocks 48 resiliently return toward their original dimensions such that the mechanism can be slid out of the pocket 12.

Therefore, it can be seen that the present invention at least satisfies its stated objectives.

The preferred embodiment of the present invention has been set forth in the drawings and specification, and although specific terms are employed, these are used in a generic or descriptive sense only and are not used for purposes of limitations. Changes in the form and proportion of parts, as well as in the substitution of equivalents, are contemplated as circumstances may suggest or render expedient without departing from the spirit and scope of the invention as further defined in the following claims.

What is claimed is:

1. A tie down mechanism for a vehicle having a stake pocket comprising:

an elongated tie down post;

a hollow stake post including a hollow shaft adapted to fit in the stake pocket;

the hollow shaft including an aperture therein for slidably receiving the tie down post;

means for securing a portion of the hollow shaft in the stake pocket;

a spring operably located between the stake post and the tie down post for yieldingly biasing the tie down post to extend relative to the stake post;

the tie down post including a cam groove therein;

a cam follower including a lower end pivotally connected to the stake post and an upper end having a cam follower pin thereon for insertion into and following of the cam groove.

2. The tie down mechanism of claim 1 wherein the tie down post has an upper portion and a lower portion, the upper portion has an aperture therethrough and a continuous wall fully encircles the aperture of the tie down post to define an eye for receiving a tie down rope.

3. The tie down mechanism of claim 1 wherein the stake post includes an enlarged head protruding laterally from the shaft so as to prevent the stake post from falling completely into the pocket.

4. The tie down mechanism of claim 3 wherein the shaft of the stake post has a rectangular cross section with front and rear walls and opposing side walls, and wherein the means for securing the shaft in the stake pocket includes a pair of resilient rubber expander block assemblies detachably mounted to the head, on adjacent each of the opposing side wall of the shaft.

5. The tie down mechanism of claim 4 wherein the expander block assemblies each include a rectangular rubber block with a hole extending longitudinally therethrough, a threaded fastener for insertion through the head and the hole, and a nut for engaging the fastener such that when the fastener is rotated relative to the nut the rubber block is squeezed between the nut and the head thereby causing at least one transverse dimension of the block to increase.

6. The tie down mechanism of claim 1 wherein the cam groove has a heart-shaped profile in a vertical plane.

7. The tie down mechanism of claim 6 wherein the heart-shaped cam groove has a right lobe portion, a left lobe portion, and upper and lower intermediate portions interconnecting the right and left lobe portions, the right lobe portion extending upwardly to a point of maximum upward extension defining a latching point and the left lobe extending upwardly to a point of maximum upward extension defining a releasing point, the latching point being located above the upper intermediate portion but below the releasing point, whereby the tie down post can be pushed down from an extended position, latched in a retracted position, and pushed downward further to be released from the retracted position and return to the extended position.

8. The tie down mechanism of claim 1 wherein the cam follower pin is round.

9. The tie down mechanism of claim 8 wherein the cam follower pin is cylindrical.

10. The tie down mechanism of claim 1 wherein the stake post comprises a rear wall having an interior surface with a longitudinal groove formed therein to provide clearance for the cam follower and permit pivotal and longitudinal movement of the cam follower about a pivot pin mounted to the rear wall of the stake post.

11. A tie down mechanism for a vehicle having a stake pocket of a given depth comprising:

an elongated tie down post having a length less than the depth of the stake pocket;

a hollow stake post including a hollow shaft adapted to fit in the stake pocket and an enlarged head protruding laterally from the shaft so as to prevent the stake post from falling completely into the pocket, the stake post shaft having opposing front and rear walls, opposing side walls, and an aperture between the front, rear and side walls for slidably receiving the tie down post;

a pair of independently operable expander block assemblies mounted on the head for frictionally securing the stake post in the stake pocket, one of the expander block assemblies engaging one of the side walls of the stake post and the other of the expander block assemblies engaging another of the side walls of the stake post;

a spring operably located between the stake post and the tie down post for biasing the tie down post to extend relative to the stake post; and yieldable means for retaining the tie down post in extended and retracted positions respectively relative to the stake post without exposed levers and tools.

12. A tie down mechanism for a vehicle having a stake pocket comprising:

an elongated tie down post having a closed loop eye opening therethrough;

a hollow stake post including a hollow shaft adapted to fit in the stake pocket;

means for securing the stake post with respect to the stake pocket;

the hollow shaft including an aperture therein for slidably receiving the tie down post;

a spring operably located between the stake post and the tie down post for yieldingly biasing the tie down post to extend relative to the stake post;

a cam groove and follower means interconnecting the tie down post and the hollow shaft so as to define a first position in which the tie down post is extended with respect to the hollow shaft such that at least a portion of the eye is exposed, a second position in which the tie down post is retracted into the shaft and restrained by the cam groove and follower means such that the eye is concealed in the absence of an external force, and a third position wherein the tie down post is pushed downwardly into the shaft beyond the second position by an external force such the tie down post will extend once the external force is decreased.

13. A tie down mechanism for receiving a flexible tie member and for use in a vehicle having a stake pocket comprising:

a hollow stake post adapted to fit within the stake pocket, the stake post having an upstanding aperture therein with an upwardly presented aperture opening;

attachment mechanism for attaching the stake post within the stake pocket;

an elongated tie down post having a loop eye therein for receiving the flexible tie member;

the tie down post being received within said upstanding aperture of said stake post and being movable from a retracted position wherein the loop eye is within the aperture of the stake post to an extended position wherein the loop eye moves through said aperture opening and is outside the upstanding aperture of the stake post;

a cam groove formed in and immovable with respect to one of the stake post and the tie down post;

a cam follower movably mounted with respect to the other of the stake post and the tie down post;

the cam groove engaging and guiding the cam follower to guide the tie down post between the retracted position and the extended position;

the cam follower being pivotal about a cam follower axis less than 360° while being guided by the cam groove during movement of the tie down post back and forth between the retracted and extended positions.

14. A tie down mechanism according to claim 13 and further comprising a spring yieldably urging the tie down post to the extended position.

15. A tie down mechanism according to claim 14 wherein the cam follower is movable within the cam groove from a first position holding the tie down post in the retracted position to a second position permitting the spring to move the tie down post to the extended position.

16. A tie down mechanism according to claim 13 wherein the cam follower is pivotally mounted with respect to the other of the stake post and the tie down post.

17. A tie down mechanism according to claim 14 wherein the cam follower is pivotally mounted with respect to the other of the stake post and the tie down post for pivotal movement about a horizontal axis.

18. A tie down mechanism according to claim 13 wherein the groove is in the tie down post and the cam follower is movably mounted to the stake post.

19. A tie-down mechanism according to claim 13 wherein the cam groove has a heart-shaped configuration.

* * * * *